Patented June 25, 1940

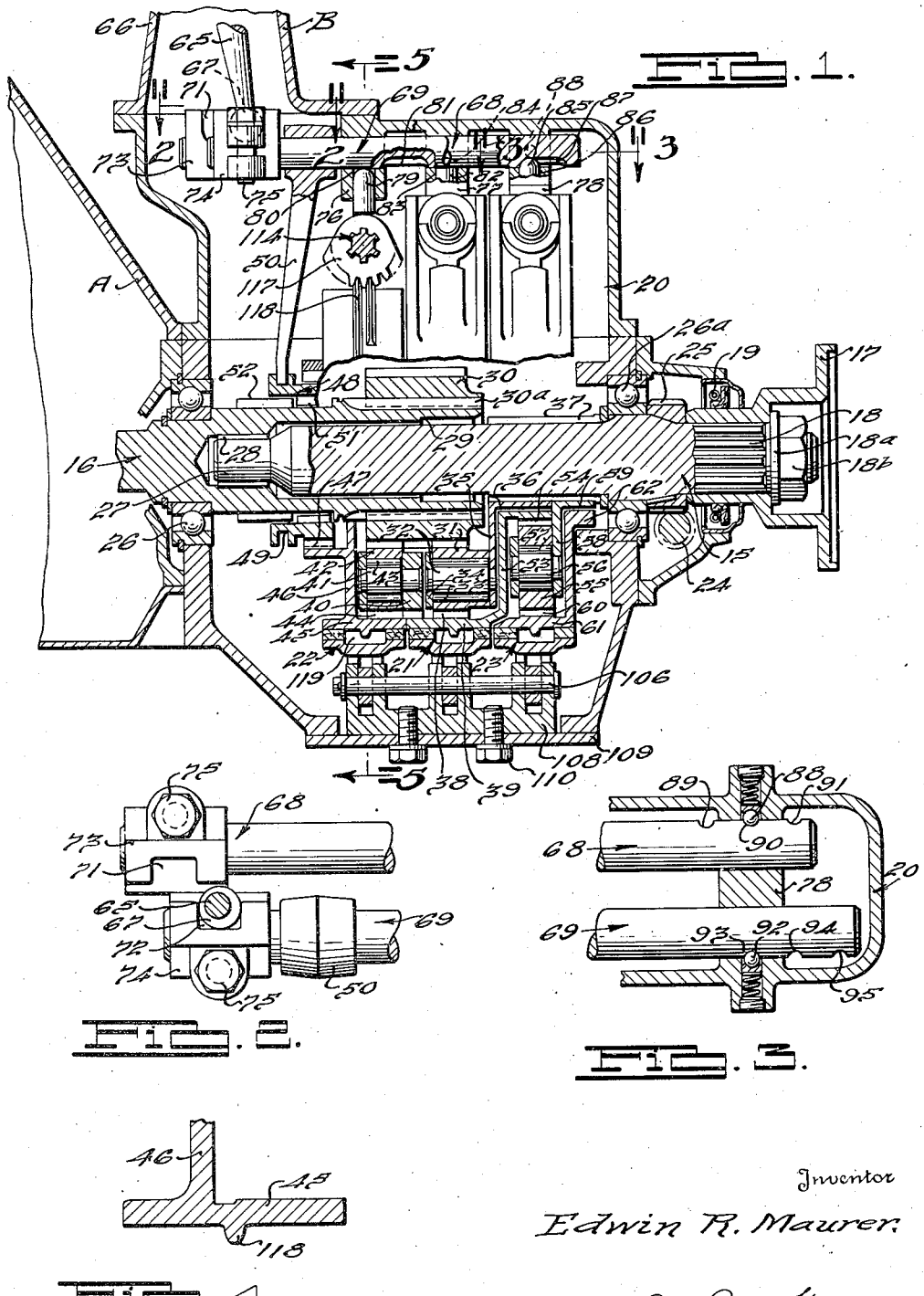

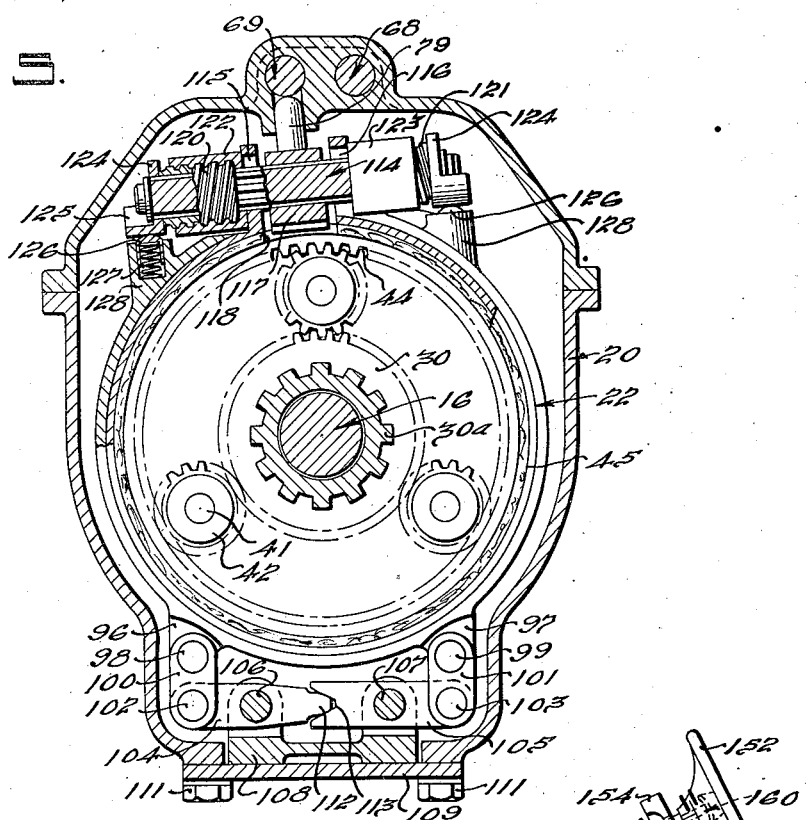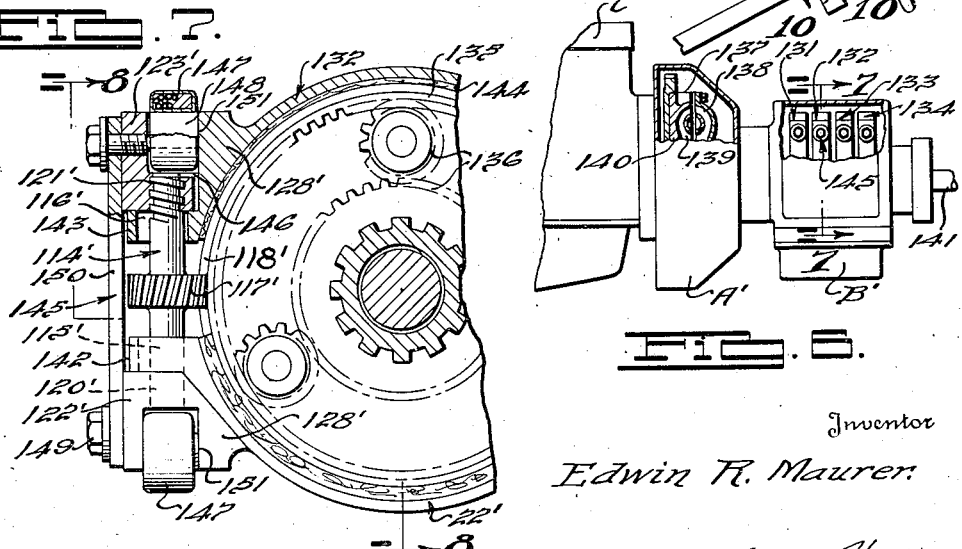

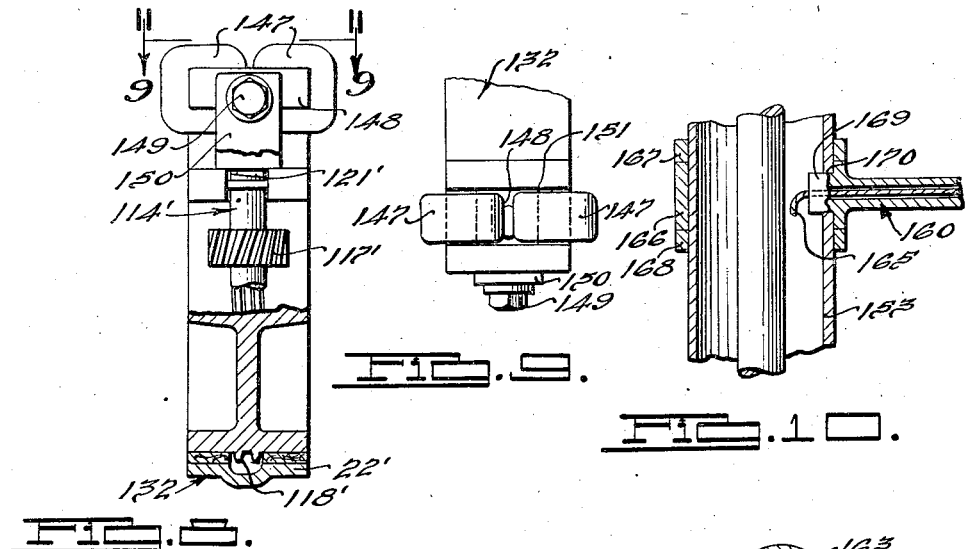

2,205,485

UNITED STATES PATENT OFFICE 2,205,485

POWER TRANSMISSION

Edwin R. Maurer, Detroit, Mich., assignor to Chrysler Corporation, Highland Park, Mich., a corporation of Delaware Application October 26, 1937, Serial No. 171,166

10 Claims. (Cl. 74—262)

This invention relates to driving mechanisms and refers more particularly, in one embodiment thereof, to improvements in driving mechanisms for motor cars or vehicles, especially where it is desired to vary the driving speed ratio between the vehicle engine or prime mover and the propelling ground wheels.

My invention has among its objects the provision of improvements in the drive and control for power transmission systems of the type including the well-known epicyclic or planetary transmission gear box. With such epicyclic transmissions, it is customary to arrange the gearing to provide for the desired number of speed ratios between the engine and vehicle driving ground wheels and such gearing is customarily selected and controlled to obtain the desired ratio by actuation of any one of a group of transmission gearing braking devices usually consisting of reaction brake bands associated with and controlling the rotation of corresponding drums or similar elements of the various epicyclic gear trains or sets of planetary gearing.

Another object of my invention resides in the provision of an improved epicyclic speed ratio changing transmission particularly adapted to respond in its actuation to my improved power transmission control.

In carrying out the aforesaid objects of my invention I have provided an improved form and arrangement of an epicyclic speed ratio changing transmission preferably adapted to have its speed ratios selected and controlled by actuation of one of its transmission speed ratio braking devices or clutches.

In order to effect the aforesaid selective actuation of one of my transmission speed ratio braking devices, I have provided a novel and inexpensive servo-action mechanism whereby the energy of the rotating drum of the selected gear train is utilized to actuate a braking device.

A further object of my invention, in certain more limited aspects thereof, is to provide a control means whereby the vehicle driver selects through a well-known gear shift lever adapted for movement in an H shaped path the speed ratio desired in my improved transmission, and thereby actuates my servo-action mechanism for the selected gear train to brake the drum in order to drive my transmission in the speed ratio selected.

A still further object of my invention resides in the provision of another control means by which the vehicle driver selects through a conventient remote control the speed ratio desired in my improved transmission, and thus effects the actuation of electrically-actuated servo-action mechanism for the gear train selected, thereby energizing the brake band to hold the drum in order to provide the selected speed ratio drive through the transmission.

Further objects of my invention reside in the provision of an improved driving mechanism and in the novel combination and arrangement of parts thereof more particularly hereinafter described and shown in several detailed embodiments in order to illustrate the details and principles of my invention, reference being had to the accompanying drawings in which:

Fig. 1 is a vertical sectional view of a power transmitting device embodying the invention.

Fig. 2 is an enlarged plan view taken approximately as indicated by the line 2—2 of Fig. 1.

Fig. 3 is an enlarged plan view, partly in section, taken approximately as indicated by the line 3—3 of Fig. 1.

Fig. 4 is an enlarged detail sectional view of a portion of one of the gear train brake drums illustrated in Fig. 1.

Fig. 5 is a transverse sectional view taken as indicated by the line 5—5 of Fig. 1.

Fig. 6 is a side elevational view, somewhat diagrammatic in portions, illustrating a power transmitting device embodying a modified form of the actuating means for the brake band operating mechanism shown in Figs. 1 and 5, parts being broken away and in section.

Fig. 7 is an enlarged fragmentary transverse sectional view taken on the line 7—7 of Fig. 6.

Fig. 8 is a sectional view taken on the line 8—8 of Fig. 7.

Fig. 9 is a view taken as indicated by the line 9—9 of Fig. 8.

Fig. 10 is a detail sectional view taken on the line 10—10 of Fig. 6.

Fig. 11 is a fragmentary diagrammatic view of the selector mechanism shown in Fig. 6, the selector element being shown in second speed position.

Fig. 12 is an illustrational view showing the wiring diagram for the control mechanism illustrated in Figs. 6 and 11.

The invention is illustrated and described in connection with a motor vehicle drive including a main clutch (not shown), having a casing generally indicated at A, adapted to be driven from the engine (not shown) and a change speed transmission or gear box B. The drive from the clutch is through a shaft 16 to the transmission B and thence through a power take-off shaft 15. Splined on the rear end portion of the shaft 15 is a brake drum flange 17 adapted to be connected with a propeller shaft (not shown) for transmitting the drive to the vehicle driving wheels. The flange 17 is retained against rearward axial movement by a nut 18 threaded on the end of the shaft 15.

The engine clutch may be of any well known design, such as the friction or fluid type, forming an operating connection between the prime mover and the transmission B.

The speed ratio changing transmission B is of the epicyclic or planetary type and is housed within a casing 20 having openings in the front and rear end portions for receiving the shafts 16 and 15, respectively. Bearings 26 and 26ª are supported in the aforesaid open end portions for journaling the shafts 16 and 15 respectively, and the latter has a forward end portion extending into a bore in the former and journaled therein by a bearing 28. An oil seal assembly 19 encircles the brake drum flange 17 for preventing escapement of lubricant from the housing 20. The usual speedometer drive take-off 24 is illustrated in engagement with a driving gear 25 operated by the driven shaft 15.

The transmission B includes a plurality of speed ratio controlling devices or braking elements 21, 22 and 23 adapted to arrest rotary movement of respective drum members driven by the shaft 16 through gear trains for effecting the desired speed ratio. As illustrated, the elements 21, 22 and 23 are selectively actuated for controlling the first, second and reverse drive, respectively.

A compound sun gear 30 for the first and second speed gear trains is drivingly connected to the driving shaft 16 by splines 30ª. According to generally customary practice, each planetary gear train includes a plurality of spaced planet gears, preferably three in number, one of the gears 31 of the low speed train being shown in the drawings as journaled by an axle 32. This axle preferably journals its gear 31 by anti-friction rollers 33 and a bushing or washer 34 is located on the forward side of the gear 31. A carrier 35 is drivingly fixed to the axles 32 of the first or low speed planet gears 31, a rearwardly extending portion 36 being drivingly connected to splines 37 of driven shaft 15.

The gears 31 mesh with the compound sun gear 30 and also with an internal gear annulus 38 carried by a low speed drum 39 which is adapted for engagement by brake 21.

The forward portion of the drum 39 is drivingly connected by its internal annulus gear 38 to a second speed carrier 40 fixed to an axle 41, this axle preferably journaling a planet gear 42 by anti-friction rollers 43. The gear 42 meshes with the compound sun gear 30 and with an internal annulus gear 44 carried by a second speed drum 45 which is adapted to be engaged by the brake 22. A forward extension 46 of the second speed drum 45 is adapted for rotational movement independently of driving shaft 16 and receives through an internal spline 47 a shiftable clutch member 48 in driving connection therewith. Formed on the clutch member is an annular groove 49 which receives a shifter fork 50, the fork being adapted to effect direct speed by shifting the clutch member forwardly to place its internal splines 51 in driving engagement with an external spline 52 carried by the driving shaft 16, as will presently be more apparent.

A rearwardly extending cylindrical portion 53 of the low speed drum 39 closely surrounds the portion 36 and has formed thereon a sun gear 54 of the reverse speed gear train. Included in this gear train is a planet gear 55 which is journaled on an axle 56 by anti-friction rollers 57. The axles 56 of the reverse speed planet gears are drivingly fixed to a carrier 58 having a rearward extension 59 in driving connection with splines 37 of driven shaft 15.

The gear 55 meshes with the sun gear 54 and also with an internal annulus gear 60 carried by a reverse speed drum 61 which is adapted to be engaged by brake 23 for reverse speed. A rearward extension 62 of drum 61 closely surrounds the extension 59.

It will be noted that the parts are closely nested together against displacement, especially axially. Normally, as illustrated, the brakes have clearance with their associated drums. For obtaining a drive in low or first gear, brake 21 is actuated to arrest rotation of drum 39, all other brakes being free together with the shiftable clutch member 48. Similarly, for second speed, brake 22 grips drum 45; for direct speed, clutch member 48 moves forwardly to place its internal splines 51 in driving engagement with the external spline 52 of driving shaft 16; for reverse, brake 23 grips drum 61. Only one of the brakes or clutch member 48 is actuated at a time into gripping engagement with its associated drum, all other parts of the mechanism running freely.

When brake 21 is actuated for low gear drive, such drive is obtained by the compound sun gear 30 operating planet gears 31 about their axes, the internal gear 38 being fixed and carrier 35 revolving in the direction of driving shaft 16 for driving the latter.

If the second speed is desired, brake 22 acts to hold the drum 45 fixed, the compound sun gear 30 acting on planetary gears 42 to drive the driven shaft 15 by reason of the interconnection provided between carrier 40 and internal annulus gear 38 and between carrier 35 and the driven shaft 15, by reason of the inter-connection heretofore described, the drum 39 being freely rotatable.

When third or direct speed is desired, the internal splines 51 engage the external splines 52 of driving shaft 16, whereby the compound sun gear 30 and the second speed annulus gear 44 are both driven at the speed of shaft 16, causing the first and second speed gear trains to rotate as a unit with shaft 16.

For reversing the drive, brake 23 engages drum 61, the sun gear transmitting the drive through the reverse gear train, it being noted that planet gear carrier 58 is fixed to the driven shaft 15 while the freely rotatable drum 39 is connected to sun gear 54. Holding of the internal gear 60 produces the reverse speed ratio drive between the shafts.

It will be understood that such terms as "low", "second", "third" or "high" as applied to the speed ratios are used in a relative sense in order to indicate progressions in speed ratio values.

To operate my speed ratio changing mechanism B, I prefer to use my improved control means including the well known gear shift lever operating in a substantially H-shape path and positioned for convenient manipulation by the vehicle driver.

Thus, I have illustrated a portion of a gear shift lever 65 pivotally supported by a stack support member 66 fixed to the casing 20. An actuating end portion 67 of lever 65 is adapted for transverse and longitudinal movement by the vehicle operator and thereby imparts this movement to either of the parallel shifter rails 68 and 69 for low and reverse speeds, and for second and direct speeds respectively. To effect this movement of rails 68 and 69, the end portion 67 of lever 65 is positioned within normally aligned slots 71 and 72 carried by block members 73 and 74 fixed as by bolts 75 to rails 68 and 69 respectively (best shown in Fig. 2).

The rails 68 and 69 are suitably supported by extensions of casing 20 generally indicated at 76, 77 and 78. Rail 69 is illustrated in its rearward or second speed position wherein a releasable detent 79 acting in a passage 80 in casing extension 76 has been moved out of engagement with an elongated slot 81 in rail 69 so that this detent is forced downwardly in passage 80 by the full portion of this rail. When the rail 69 is in its normal or neutral position the detent 79 is substantially centered within slot 81. If rail 69 is shifted to its forward or direct drive station, the shifter fork 50 fixed to rail 69 during this movement carries the clutch member 48 forwardly to place its internal splines 51 in driving connection with the external splines 52 of the driving shaft 16.

Rail 68 is illustrated in its normal or neutral station wherein a releasable detent 82 acting within a passage 83 in casing extension 77 is positioned at the rearward end of an elongated slot 84 in rail 68. Similarly, another releasable detent 85 acts within a passage 86 in casing extension 78 and is illustrated as being at the forward end of an elongated slot 87 in rail 68. It is obviously evident that when rail 68 is moved forwardly to its usual forward or first speed station, the detent 82 will ride out of slot 84 in cam-like fashion; similarly when rail 68 is moved rearwardly beyond its illustrated neutral position to its rearward or reverse speed station, the detent 85 will cam out of slot 87. The purpose of elongating the slots 84 and 87 is to prevent actuating both of detents 82 and 85 simultaneously.

To assist in maintaining the rails 68 and 69 in the position desired, releasable detents may be provided to act on these rails. Thus, a releasable detent ball 88 (best shown in Fig. 3) is carried by casing extension 78 and is adapted to releasably engage grooves 89, 90 or 91 of rail 68 in low speed, neutral, or reverse speed position respectively. Similarly, a releasable detent ball 92 is carried by casing extension 78 to releasably engage grooves 93, 94 or 95 of rail 69 in second speed (as shown), neutral, or direct speed position respectively.

Referring now to the construction of the operation brakes 21, 22 and 23 in connection with my improved control means, inasmuch as these bands are substantially alike in construction and operation, I prefer to describe the second speed brake 22 and drum 45 as the representative one.

In order to anchor the brake or band 22 and guide the same during its contracting movement, and also to efficiently distribute the braking forces applied to drum 45 without substantial tendency toward axial displacement of the drum, I have provided a pair of circumferentially spaced anchors 96 and 97 (best shown in Fig. 5) extending outwardly from band 22, these anchors being respectively pivoted by pins 98 and 99 to the links 100 and 101. The anchors 96 and 97 are preferably located to one side of the band 22 or drum 45 opposite to the side thereof where my brake applying mechanism is located, as will hereinafter be more apparent.

The links 100 and 101 are respectively pivoted at 102 and 103 to levers 104 and 105, the latter being pivotally connected to bolts 106 and 107 respectively which extend longitudinally through the extensions of a support member 108. The support member 108 may, if desired, be fixed to a cover portion 109 of transmission casing 20 by bolts 110 as shown, or the bolts 102 and 103 may be supported directly by casing 20. As illustrated, the cover portion 109 is firmly attached to casing 20 by bolts 111. The levers 104 and 105 have their opposite ends interengaged by reason of a projection 112 of lever 104 extending into a recess 113 of lever 105, whereby movement of one lever will cause corresponding movement of the other lever. This arrangement of levers and links tends to equalize the braking effort applied by band 22 to drum 45 as aforesaid, it being apparent that any tendency of a portion of the band adjacent one of the ends thereof to engage the drum more than the other portion adjacent the other band end will immediately be offset by reason of the transference of the braking effort between the band portions through the aforesaid arrangement of levers and links.

Referring now to the construction of my representative band actuating mechanism, a splined shaft 114 extends through openings 115 and 116 in the ends of the band 22. A partially toothed pinion 117 is mounted on the splined shaft 114 for a driving connection therewith and is positioned between the band ends. The pinion 117 is illustrated as being in mesh with an annular worm gear 118 (best shown in Figs. 1 and 4) formed on the outer surface of drum 45, which position of these parts will hereinafter be referred to as the second speed setting of my band actuating mechanism, whereas the disengagement of pinion 117 from the worm gear 118 is the neutral or normal position. The releasable detent 79 is shown in its engaged or second speed position wherein it bears against the untoothed or upper portion of the pinion 117. An annular groove 119 is formed in the band 22 to accommodate the annular worm gear 118 on drum 45 when the band is contracted as shown.

Formed on either end of the splined shaft 114 are threaded portions 120 and 121 which threadedly engage thimble-shaped threaded sleeves 122 and 123 respectively. When the pinion engages the worm gear 118, the shaft 114 is rotated in a cunter-clockwise direction as viewed in Fig. 1. The cooperating portions of the shaft and sleeves are so threaded that the latter are simultaneously moved toward each other when the shaft 114 is rotated in one direction and away from each other when the shaft is rotated in the opposite direction. The closed ends of the thimble-shaped sleeves 122 and 123 bear against the ends of band 22.

Each end of shaft 114 has a freely rotatable washer 124 mounted thereon which has a flat bottom extension 125 directly in contact with a releasable detent 126 and spring 127 carried by an extension 128 of band 22. The detents 127 thereby continuously urge the pinion 117 out of engagement with the worm gear 118.

When selector lever 65 is set for second speed as illustrated, the detent 79 holds the pinion 117 in engagement with the worm gear 118 until the lever 65 is again moved by the vehicle driver at which time the detent 79 enters slot 81 and permits the pinion and the worm gear to disengage.

It is evident that when my transmission is in operation, the drum 45, prior to the time of second speed selection of lever 65 by the vehicle driver, is rotating clockwise as viewed in Fig. 5. Upon positioning the lever 65 for second speed the detent 79 is forced downwardly by its disengagement with slot 81, whereupon pinion 117 is forced into mesh with worm gear 118 of the rotating drum 45 to cause the shaft 114 to rotate counter-clockwisely as viewed in Fig. 1. This rotation of shaft 114 causes the sleeves 122 and 123 to act against the ends of band 22 as they move toward each other, this movement continuing until the drum 45 is completely braked. During this engaging and disengaging of pinion 117 with worm gear 118, the shaft 114 moves within the openings 115 and 116 of the band ends.

The detents 126 continuously tend to keep the pinion out of engagement with the worm gear 118 and to balance the shaft 114. If desired, the worm gear 118 may have a rounded tooth as illustrated in Fig. 4 to facilitate quiet engagement with pinion 117 and to assist the detents 126 in quietly and positively disengaging the pinion 117 from worm gear 118 when detent 79 is in its neutral or normal station. It will be apparent that rotary movement of the drum 45 causes the brake band 22 to be contracted and continues to maintain the band 22 in freely contracted position as long as the transmission is conditioned to operate at the selected speed ratio.

Referring to Figs. 6 to 12, inclusive, wherein is illustrated another embodiment of my invention, I have indicated members of the same function but different construction by primed reference characters.

In the drawings I have shown for illustrative purposes my power transmitting device or system which may include a main prime mover or engine C, a portion of which is shown in Fig. 6, a clutch A' driven from the engine, and a change speed transmission or gear box B'.

I have illustrated the change speed transmission B' as the epicyclic or planetary type, this general form of transmission being well known in the art and, as usual, includes a plurality of speed ratio controlling devices 131, 132, 133 and 134, these devices being adapted to act on transmission elements associated therewith usually embodied in the form of a rotary drum, one of which is illustrated at 135 in Fig. 7 in association with the second speed transmission controlling device 132. In the illustrated embodiment the controlling device 131 is ordinarily arranged as the third speed, the controlling device 133 being the first or low speed control, and 134 representing the reverse controlling device.

It will be understood that the various transmission controlling devices may be adapted in the well known way for causing actuation of the respective planetary gear trains associated therewith, these gear trains being well known in the art. In Fig. 7 I have somewhat diagrammatically illustrated one of the planetary gear trains at 136 in association with the rotary drum 135 of the transmission controlling device 132.

While any form of clutch may be employed to control the drive from engine C to transmission B', I prefer to employ a clutch A' of the fluid coupling type, this general type of clutch being illustrated in Fig. 6 and consisting of a driving outer casing structure 137 provided with the usual driving vanes 138 for directing the fluid flow toward the vanes 139 of the driven clutch member 140, the latter being adapted to transmit the drive through the fluid medium to the transmission B' as will be readily understood.

I shall next describe the details of a typical transmission controlling device, reference being had particularly to Fig. 7 in which the controlling device 132 is shown associated with the rotary drum or transmission element 135, this band or brake and cooperating drum in my illustration being the control mechanism for obtaining the second speed ratio in the drive from engine C through transmission B' to the drive shaft 141 extending therefrom for the power take-off, it being understood that where the mechanism is installed in a motor vehicle, this shaft 141 is adapted in the well known manner to propel the driving ground wheels of the vehicle (not shown).

In order to brake the drum 135 I have provided a band 22' extending around the drum to provide adjacent ends 142 and 143 arranged at one side of the drum. These band ends are normally separated so that the brake lining 144 does not contact with drum 135 except when the second speed controlling device 132 is actuated to drive the motor vehicle.

My improved band actuating mechanism, generally indicated at 145, may be employed to contract the ends 142 and 143 of the band 22', it being understood that a similar mechanism 145 is arranged to control the other devices 131, 133 and 134, as will hereinafter be more apparent.

The mechanism for actuating the band 22' consists of the shaft 114' which extends through the openings 115' and 116' in the ends 142 and 143 respectively of the band 22'. The pinion 117' is mounted on the shaft 114' for a driving connection therewith and is positioned between the band ends 142 and 143. The pinion is illustrated as being in mesh with the annular worm gear 118' formed on the outer surface of drum 135, which position of these parts will be known as the engaged position of my band actuating mechanism whereas the disengagement of pinion 117' from the worm gear 118' is the neutral or normal position.

Formed on either end of the splined shaft 114' are the threaded portions 120' which threadly engage the threaded sleeves 122' and 123' respectively. Each sleeve has a recess 146 in each of which is located a pair of magnet coils 147 having a magnet 148 housed snugly therein. Each magnet is attached securely to a sleeve by a bolt 149 passing through a connecting plate 150 extending between the sleeves 122' and 123'. For this particular embodiment, I prefer to illustrate a horseshoe magnet acting within the coils 147 although it is understood that other types may be used without departing from the novelty of my invention. Each magnet is positioned within a pair of the coils so that its open end will be adapted for a full contact on a flat surface 151 of each band extension 128'. Thus it will be seen that the shaft 114' may act within the limits of openings 115' and 116' to move the pinion 117' in and out of mesh with the worm gear 118', the openings being just sufficient to allow the pinion to clear the worm gear. With this movement of shaft 114' there is a simultaneous shifting of the threaded sleeves 122' and 123', coils 147, magnets 148, bolts 149, and the plate 150 as a unit, the open end of the magnets striking the flat surface of the extensions 128' to limit this assembly movement toward the vertical mid-plane of the transmission.

It is obviously evident that if electric current is supplied to the coils 147 of my band actuating mechanism, a magnetic field is set up therein to influence the magnet 148 to move toward the contact or flat surface 151, carrying with it the entire assembly just referred to. This movement of the magnet and the assembly is brought to an end by reason of the open end of the magnet striking the flat surface 151, at which position the pinion 117' is in full mesh with the worm gear 118' for arresting rotation of the drum 135. When the pinion 117' is thus in engagement with the worm gear 118' the band ends 142 and 143 are drawn together through rotation of the shaft 114' induced by rotary movement of the drum 135, in the same manner as set forth above in connection with the mechanism illustrated in Fig. 5.

When the current is stopped, the magnetic field within the coils 147 is disrupted and the magnet 148 is no longer influenced to move toward the contact or flat surface 151. Thereupon it is desirable to maintain the pinion 117' out of mesh with the worm gear 118' to allow the band 22' to release the drum 135. To insure the disengagement of pinion 117' from worm gear 118' when the current is off, I prefer to illustrate the worm gear as having a rounded tooth to perform this function, the rounded tooth forcing the pinion away from it sufficiently to sever the driving connection therebetween and permitting the pinion to quietly ride over the rounded tooth.

Referring to Figs. 6, 10 and 11, I have illustrated a portion of the usual steering wheel 152 mounted on the steering post 153, the steering post providing a convenient location for the manually operated selector controlling device although it will be understood that if desired this device may be located at other convenient points for operation by the vehicle driver. I prefer to illustrate in connection with my invention a selector segment 154 suitably fixed to the steering post 153, the segment carrying a plurality of operating arcuately spaced recessed electrical switch contacts 155, 157, 158 and 159 adapted for selective engagement by a manually operated hollow selector arm or lever 160 and a non-operating recess 156 interposed between contacts 155 and 157. This selector arm is somewhat diagrammatically shown as having an electrical contact member 161 preferably extending through an insulated washer 162 carried by the arm 160. The contact member is yieldably urged into engagement with the electrical switch contacts by a spring 163 having an insulated end member 164 interposed between the hollow portion of arm 160 and contact member 161. Thereby the contact member, with its supply of electrical current through a wire 165, is adapted for swinging movement to selectively contact the spaced contacts 155, 157, 158 and 159 and to supply current thereto. As illustrated, the arm 160 has a rotatable extension 166 carried by the steering post 153 between suitable stops 167 and 168, an extension 169 of arm 160 protruding through a movement limiting opening 170 in the steering post 153 to receive the wire 165.

As will be noted from the wiring diagram in Fig. 12, the contacts 155, 157, 158 and 159 are electrically connected to the coils 147 for the reverse, first, second and direct speeds respectively. Recess 156 is not electrically joined with any other member, the contact merely serving as a station to advise the operator of the neutral setting of the selector arm 160 wherein the band actuating mechanisms 145 are in their neutral or disengaged condition and the control devices 131, 132, 133 and 134 are released. The wire 165 connects one terminal of a storage battery 171, the negative terminal of the battery having connected thereto a common connecting lead 172 which has interposed between it and the contacts 155, 157, 158 and 159 the pairs of coils 147 for each of these contacts. The arm 160 is adapted for rotation to be selectively engaged with one of these contacts to provide a current from the battery to the coils 147.

In the operation of the above described control mechanism the vehicle operator selects the desired speed ratio by manipulation of the selector arm 160 to engage one of the electrical contacts, such for instance, as the contact 157 for second speed operation. Electric current is immediately supplied to the coil 147 and magnet 148 of the mechanism 145 associated with the second speed controlling device 132 and through action of the magnet 148, as heretofore described, the mechanism 145 is moved inwardly as viewed in Fig. 7, to cause the pinion 117' to mesh with the worm gear 118' carried by the drum member 135. It will be understood, of course, that the member 135 is rotating and this movement rotates the shaft 114' to move the brake band ends toward each other for causing the band 22' to arrest rotary movement of the drum 135', for transmitting a drive through the transmission to the shaft 141. The tendency of the band to rotate, maintains the band 22' in complete braking engagement with the drum. When the arm 160 is moved to break contact with the element 158, the coil is deenergized and through action of the teeth of the worm gear, due to their particular contour, the pinion is urged outwardly.

It will be understood that the various cycles of operation are performed in a manner similar to that set forth above for obtaining the different driving speed ratios.

I do not limit my invention, in the broader aspects thereof, to any particular combination and arrangement of parts such as shown and described for illustrative purposes since various modifications will be apparent from the teachings of my invention and scope thereof as defined in the appended claims.

What I claim is:

1. In a motor vehicle change speed transmission having in combination, a plurality of speed ratio gear trains, a rotary control element for each of said gear trains having a threaded exterior surface, a plurality of devices operably associated with a respective control element for resisting rotation thereof, a mechanism for actuating each of said devices including a driving pinion operably connectible with the threaded surface of one of said control members, and a transmission control mechanism for selectively operably connecting one of said driving pinions with the threaded surface of one of said rotary elements.

2. In a motor vehicle change speed transmission having in combination, a plurality of speed ratio gear trains, a rotary control element for each of said gear trains having a threaded exterior surface, a plurality of devices operably associated with a respective control element for resisting rotation thereof, a mechanism for actuating each of said devices including a driving pinion operably connectible with the threaded surface of one of said control members, an electro-magnetic means operably associated with each of said mechanisms for operably connecting the associated pinion thereof with one of said control members, and means including a transmission control member for selectively energizing said electro-magnetic means.

3. In a power transmitting mechanism including a rotatable shaft, a gear train operably associated with said shaft, said train including a rotatable control member driven by said shaft and adapted to be held against rotation for producing a drive through said gear train, means operable to frictionally hold said control member, and means movable relative to said member and said holding means and adapted to provide an operable connection therebetween for utilizing the rotational energy produced by said member for causing said frictional operation of said holding means.

4. In a power transmitting mechanism including a rotatable shaft, a gear train operably associated with said shaft, said gear train including a rotatable control member driven by said shaft and adapted to be held against rotation for producing a drive through said gear train, means operable to hold said control member, means operable to form an operating connection between said member and said holding means for utilizing the rotational energy produced by said member for causing operation of said holding means, and electrically actuated means for operating said connecting means.

5. In a power transmitting mechanism including a rotatable shaft, a gear train operably associated with said shaft, said gear train including a rotatable control member driven by said shaft and adapted to be held against rotation for producing a drive through said gear train, means operable to hold said control member, means operable to form an operating connection between said member and said holding means for utilizing the rotational energy produced by said member for causing operation of said holding means, and manually operable selector means for controlling operation of said connecting means.

6. In a power transmitting mechanism including driving and driven shafts, gear train means for transmitting a drive between said shafts, said gear train means including an element adapted to be engaged for producing said drive and a second element operable to engage said first mentioned element for producing said drive, and means comprising a gear element operably connected to said second element and adapted for positive drive connection with the first said element for operating said second mentioned element by said first mentioned element.

7. In a motor vehicle power transmission, a driving shaft, a driven shaft, speed ratio driving means for driving the driven shaft from the driving shaft at a speed proportionate thereto, said driving means including a rotatable drive control member, a device adapted for engagement with said control member to establish said speed ratio drive, means for operating said device, and means under control of the vehicle driver for establishing a driving connection between said control member and said operating means for utilizing the rotational energy of said control member to effect engagement of said device therewith.

8. In a motor vehicle power transmission, a driving shaft, a driven shaft, speed ratio driving means for driving the driven shaft from the driving shaft at a speed proportionate thereto, said driving means including a rotatable drive control member, mechanism operable to control rotation of said member including means frictionally engageable with said member for holding the latter against rotation to establish said speed ratio drive, said mechanism further including an element having a permanent operating connection with said holding means and operable to form a driving connection between said control member and said holding means for utilizing the rotational energy of said control member to effect engagement of said holding means therewith, and vehicle driver control means operable to cause operation of said element.

9. In a motor vehicle power transmission, a driving shaft, a driven shaft, speed ratio driving means for driving the driven shaft from the driving shaft at a speed proportionate thereto, said driving means including a rotatable drive control member, mechanism operable to control rotation of said member including means frictionally engageable with said member for holding the latter against rotation to establish said speed ratio drive, said mechanism further including an element having a permanent operating connection with said holding means and operable to form a driving connection between said control member and said holding means for utilizing the rotational energy of said control member to effect engagement of said holding means therewith, vehicle driver control means, and electrically actuated means operable in response to operation of said vehicle driver control means for causing operation of said element.

10. In a power transmitting mechanism including a plurality of selectively operable speed ratio gear trains, at least one of said trains including a rotatable control member adapted to be restrained against rotation for producing a drive through said gear train, means for restraining said member against rotation, means controlling the selective operation of said gear trains, and means responsive to operation of said control means adapted to provide an operable connection between said member and said restraining means for utilizing the rotational energy produced by said member for causing operation of said restraining means.

EDWIN R. MAURER.